(Model.)
J. EDSON.
TRUSS.
No. 259,116. Patented June 6, 1882.
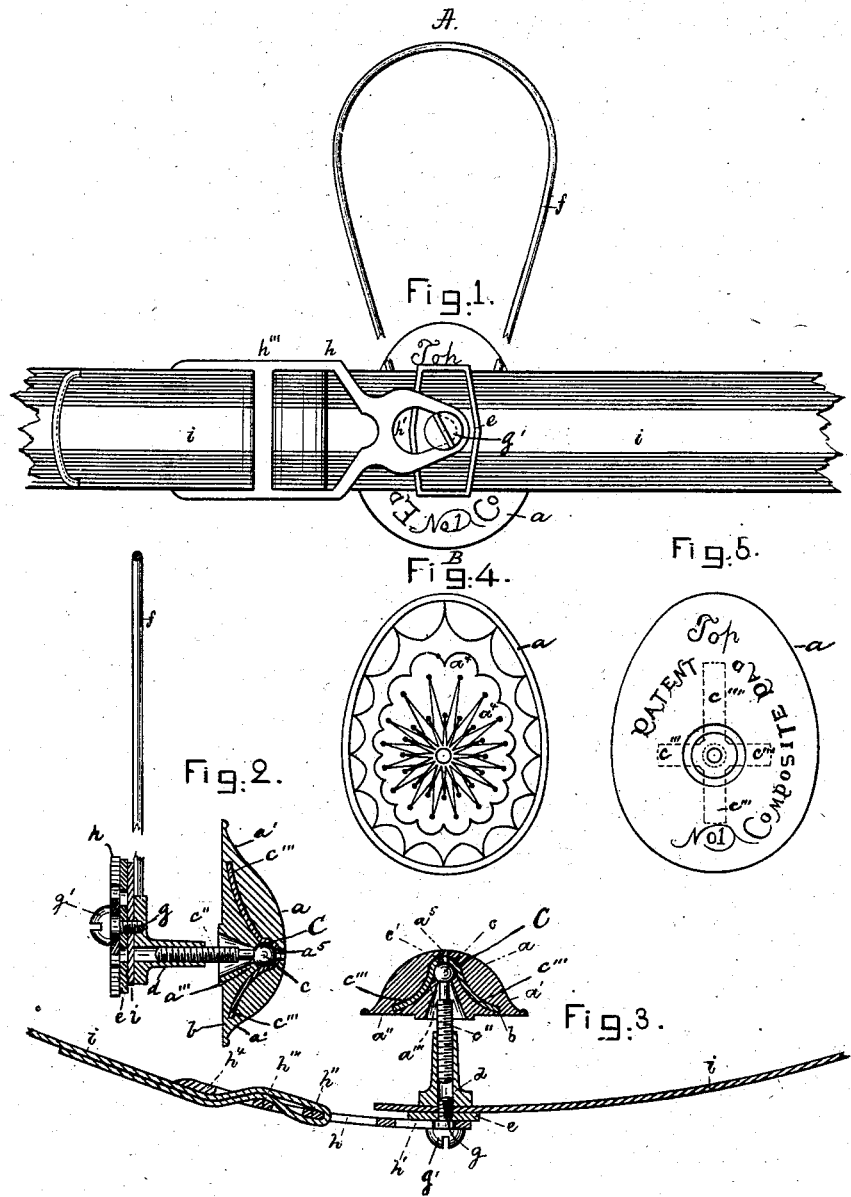
Witnesses
Henry Chadbourn.
Alfred Chadbourne.
Inventor
Jacob Edson.
by Alban Andrew his atty.

UNITED STATES PATENT OFFICE.

JACOB EDSON, OF BOSTON, MASSACHUSETTS.

TRUSS.

SPECIFICATION forming part of Letters Patent No. 259,116, dated June 6, 1882.

Application filed September 27, 1881. (Model.)

*To all whom it may concern:*

Be it known that I, JACOB EDSON, a citizen of the United States, residing at Boston, in the county of Suffolk and State of Massachusetts, have invented certain new and useful Improvements in Trusses; and I do hereby declare that the same are fully described in the following specification and illustrated in the accompanying drawings.

This invention relates to improvements in trusses; and it is carried out as follows, reference being had to the accompanying drawings, in which—

Figure 1 represents a front elevation of the invention. Fig. 2 represents a vertical section on the line A B, shown in Fig. 1. Fig. 3 represents a horizontal section of the pad and strap. Fig. 4 represents a plan view of the under side of the pad; and Fig. 5 represents a plan view of the outside of the pad, as will hereinafter be more fully shown and described.

$a$ is the pad, made of molded rubber or other elastic material, which is molded around the metal core C, the latter having flexible radial arms $c'''$ $c'''$ $c'''$ $c'''$, adapted to be bent to any required shape, so as to fit the pad to the rupture for which it is to be worn. The rubber $a$, being molded around the metal core C, produces a composite pad, hard and firm in its central bearing and yielding at its outer periphery—a very desirable object in a perfect truss. The under side of the pad $a$ is made with a concave edge, $a'$, and the top is preferably made flat, as shown at $b$ in Figs. 2 and 3, by which the periphery of the pad is rendered very pliable and yielding.

$c$ is a metal ball resting against the metallic core C, having a bearing thereon, and it is held in place by the upper elastic bearing, $a'''$ $a'''$, so as to allow the ball $c$ to be easily inserted into the pad and there held in place.

$c''$ is a screw-threaded shank, extending forward from the ball $c$, and made adjustable within the screw-threaded sleeve $d$, as shown in Fig. 3, to regulate the pressure on the body of the wearer, as may be desired. The base of the sleeve $d$ is secured to the belt $i$ and strap-clamp $e$ by means of the screw $g$, as shown in Figs. 2 and 3. The under side of the pad $a$ is provided with suitable raised configurations, $a^4$ $a^4$, (shown in Fig. 4,) to prevent the pad from slipping or turning when in use. $a^5$ is an aperture in the bottom of the pad $a$, and $c'$ is a similar aperture in the metal core C, which apertures serve for ventilation and passage of perspiration from the body of the wearer of the truss.

$f$ is an arched abdominal guard, secured to the base of the sleeve $d$, which guard constitutes a bearing on the abdomen, to keep the pad in place and to receive a part of the pressure of the belt $i$, the center of the latter being arranged above that of the pressure on the pad, for the purpose of reaching a lower rupture than could be reached with a pad having no such abdominal guard. The guard $f$ may be reversed or turned more or less to one side, or dispensed with altogether, if desired, to reach any required point of the body, or, if the rupture is sufficiently high, to enable the belt to do the work without such guard.

$h$ is the lever-fastener, having pear-shaped opening $h'$, adapted to be locked on the head $g'$ of the screw $g$. The lever-fastener $h$ has three cross-bars, $h''$ $h^3$ $h^4$, for the purpose of holding and regulating the length of strap $i$, as shown in Figs. 1 and 3. The perforated end $h'$ of the lever-fastener $h$ constitutes a lever to give the required pressure on the body without undue tightness of the strap. A tripod bearing on the body of the wearer is obtained by the arched abdominal guard $f$, combined with the pad $a$ and end $h^4$ of the lever-fastener $h$, by which arrangement the truss can be worn with perfect ease and with less discomfort as compared with other pads and trusses now in use.

Having thus fully described my invention, I wish to secure by Letters Patent, and claim—

1. The combination of the elastic pad, having a central socket and an opening leading through the flat side of the pad to its said socket, with the screw-threaded pin provided upon one end with a ball received into the socket in the pad, the screw-threaded sleeve formed with a base-plate and adapted to receive the screw-threaded pin, and the clamp-plate secured by a screw to the base-plate of the screw-threaded sleeve, substantially as described.

2. The combination, in a truss, of the pad with the screw-threaded sleeve, receiving a pin for connecting the same with the pad, and the arched abdominal support $f$, secured to the base-plate of said sleeve, substantially as described.

3. The elastic pad, the inclined metal socket-piece C, with radial arms, the screw-threaded pin having its ball-shaped head received into the socket of piece C, the screw-threaded sleeve receiving the said pin and formed with a base-plate, the belt, and the clamp-plate $h$, holding the belt against the base-plate by a screw, said members being organized and formed substantially as described.

4. The elastic pad provided with internal metallic arms, serving in its center as a bearing for the ball C of the connecting-rod $c^2$, and having the annular elastic holding $a'''$ for connecting the pad to the ball and to admit of its easy removal, substantially as shown and described.

In testimony whereof I have affixed my signature in presence of two witnesses.

JACOB EDSON.

Witnesses:
ALBAN ANDRÉN,
JOHN H. FOSTER.